United States Patent [19]
Stocker

[11] 3,940,153
[45] Feb. 24, 1976

[54] LABYRINTH SEAL

[75] Inventor: Harold L. Stocker, Brownsburg, Ind.

[73] Assignee: General Motors Corporation, Detroit, Mich.

[22] Filed: Dec. 9, 1974

[21] Appl. No.: 530,836

[52] U.S. Cl............................... 277/57; 277/DIG. 1
[51] Int. Cl.².................... F16J 15/48; F02F 11/00
[58] Field of Search............ 277/53, 54, 55, 56, 57, 277/DIG. 1

[56] References Cited
UNITED STATES PATENTS

| | | | |
|---|---|---|---|
| 2,916,332 | 12/1959 | Pavlecka | 277/53 |
| 3,572,728 | 3/1971 | Smuland | 277/57 |

FOREIGN PATENTS OR APPLICATIONS

| | | | |
|---|---|---|---|
| 646,436 | 6/1937 | Germany | 277/56 |
| 45-613 | 1970 | Japan | 277/53 |

*Primary Examiner*—Samuel B. Rothberg
*Attorney, Agent, or Firm*—Paul Fitzpatrick

[57] ABSTRACT

A labyrinth seal has two relatively rotatable members which are configured to define between them a succession of annular orifice or clearances between seal knives on one member and generally cylindrical surfaces or lands on the other. The members define a doubly recurved flow path from each orifice to the orifice next downstream. The first reversal of flow is effected by a barrier at the downstream end of the land having a hemi-toroidal surface to deflect the flow back toward the orifice. Flow is again reversed in passing around the barrier and flows between the barrier and the other seal member to the next downstream orifice. A ring of slots through the barrier tangential to the hemi-toroidal surface discharges some of the flow into the twice reversed flow so as to provide an aerodynamic dam to increase turbulence and reduce the flow area and, therefore, increase pressure drop and sealing effectiveness.

4 Claims, 4 Drawing Figures

LABYRINTH SEAL

The invention described herein was made in the course of work under a contract with the Department of Defense.

My invention relates to labyrinth seals. As is well known, these are devices in which a gas (or, in some cases a liquid) flows through an annular path between two relatively rotatable members. At successive stations the members are in very close proximity to each other to define annular slit-like orifices which are ordinarily as narrow as is feasible. Between these orifices, the flow enters enlarged chambers in which the velocity energy is largely dissipated in turbulence. This turbulence reduces the pressure through successive orifices so that the leakage or undesired flow is minimized, while the seal avoids any direct contact of relatively moving surfaces.

My invention involves the concept of flow in a doubly recurved or S-shaped path, as considered in a section passing through the axis of the seal, between each orifice and the next downstream orifice, and particularly involves structure to divert a part of the flow from the first return bend to intersect the flow downstream of the second return bend so as to increase turbulence and thereby the pressure loss and sealing efficiency of the seal.

The principal objects of my invention are to provide an improved labyrinth seal; to provide a labyrinth seal of high sealing effectiveness and simple structure; and to provide a seal which employs interference between intersecting streams of fluid to increase turbulence and thus sealing efficiency.

The nature of my invention and its advantages will be apparent to those skilled in the art from the succeeding detailed description of the preferred embodiment of the invention, the accompanying drawings thereof, and the appended claims.

Referring to the drawings.

Figure 1:
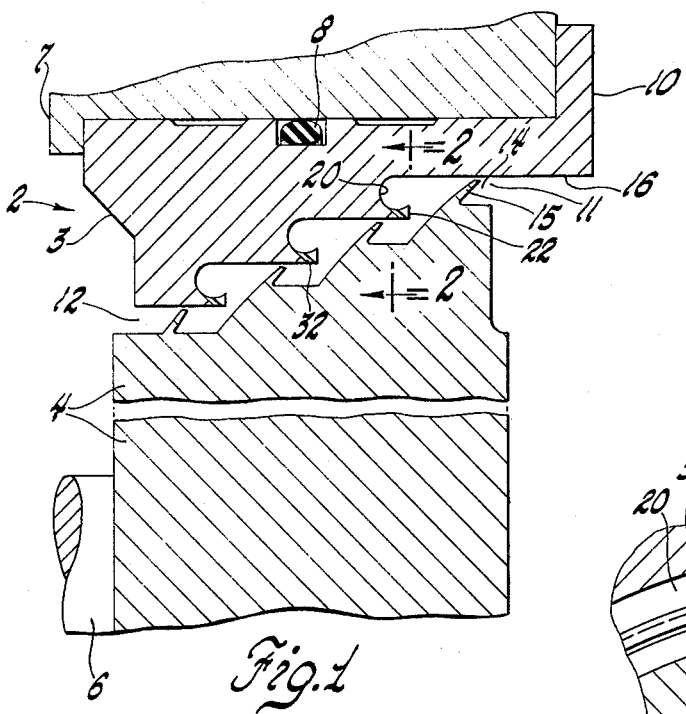
FIG. 1 is a longitudinal section of a labyrinth seal installation, taken in a plane containing the axis of rotation.
Figure 2:
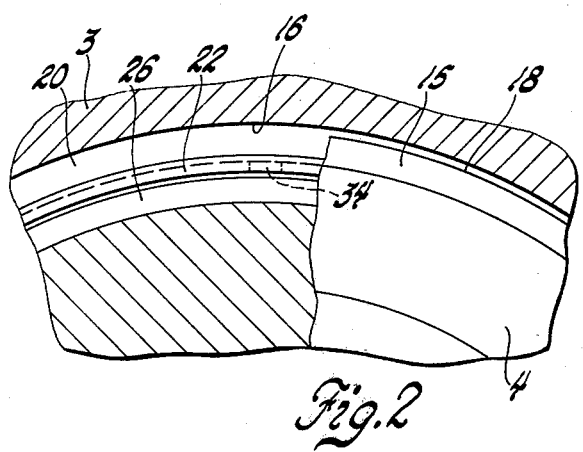
FIG. 2 is a fragmentary view of the same, with parts broken away and in section on the plane indicated by the line 2—2 in FIG. 1.

The drawings show an axial-flow labyrinth seal 2 comprising an outer stationary member 3 and an inner rotating member 4. The inner member 4 may be integral with or fixed suitably to a rotating member, such as a shaft 6, for example. The outer stationary member may be suitably fixed to a support 7 which may be some part of the frame of an engine. The stationary member 3 may have a generally cylindrical outer surface with a circumferential recess to receive an O-ring seal 8 and may have a flange 10 through which bolts (not illustrated) are inserted to fix it in place.

Such seals are used to minimize leakage or control flow of air or other gases in compressors, turbines, and other rotating machinery, as is well known. Two examples of the application of such seals are described in U.S. patents to Atkinson et al., U.S. Pat. No. 2,848,284, Aug. 19, 1958, and U.S. Pat. No. 2,951,337, Sept. 6, 1960.

The seal 2 is disposed between two spaces containing air or other gas at different levels of pressure. Specifically, with the structure illustrated in FIG. 1, the higher pressure or upstream end of the seal is at 11 and the lower pressure or downstream end of the seal is at 12. The downstream end may be vented to atmosphere or subatmospheric pressure depending upon the installation. In other installations, both ends of the seal may be at quite high pressures, but the difference of pressure is from the end 11 to the end 12 in either case.

The above background material applies to conventional labyrinth seals. The invention to which this patent application is directed lies in the configuration of the confronting surfaces of the seal members; that is, the interior surface of the stationary member 3 and the exterior surface of the rotating member 4, particularly the former.

Gas enters between the seal members 3 and 4 through an entry space 14 the downstream end of which is nearly blocked by a rotating seal knife or ridge 15. As illustrated, the seal knife is inclined upstream at approximately 45° from the radial direction, which is preferred. However, the seal knife may be inclined at other angles or be perpendicular to the axis. The gas flows between a cylindrical seal surface or land 16 on the interior of the stationary member and the outer margin 18 of the seal knife 15, as indicated by the arrow 19. The gas flows generally along the cylindrical surface 16 until it is redirected toward the seal knife by a hemi-toroidal surface 20 defined by a recess in the member 3. The inner surface of this recess is defined by a barrier 22 extending back generally toward the knife 15. The outer surface of the barrier preferably slopes slightly outward toward the seal surface 16. As indicated by the arrows 23 and 24, a part of the gas flows in a generally hemi-toroidal path following the surface 20, and then flows backward toward the knife 15. The path for escape of the gas is, of course, between a second seal knife 26 and a second land 27 and on between successive seal knives and lands to the downstream end 12 of the seal. The gas flow thus must recurve and flow as indicated generally by the arrows 28 and 30 from the space between the seal surface 27 and the outer generally cylindrical surface 31 of the rotating member 4. This retroverted flow sets up a considerable degree of turbulence in addition to what will naturally result from the expansion of the gas after it passes through the orifice between seal margin 18 and the seal surface 16.

Figure 3:
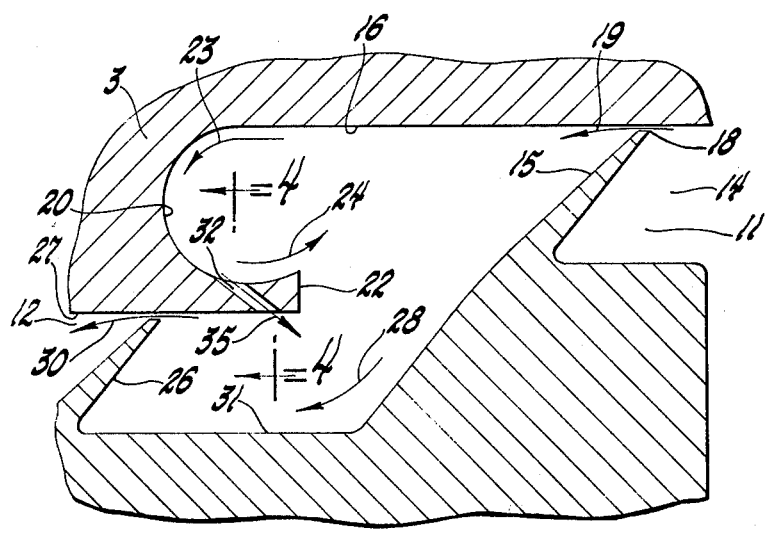
FIG. 3 is a greatly enlarged fragmentary view taken in the same plane as FIG. 1.
Figure 4:
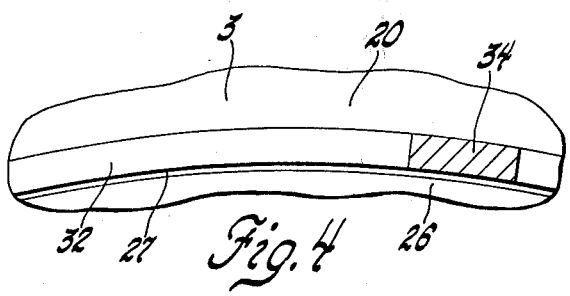
FIG. 4 is a fragmentary sectional view taken on the surface indicated by the line 4—4 in FIG. 3.

According to my invention, additional turbulence and pressure loss is created by diverting a relatively small portion of the flow through a ring of slots 32 lying in a generally conical surface as shown most clearly in FIG. 3. A continuous slot is not feasible, since means must be provided to support the outer portion of barrier 22. For this reason, bridges 34 extend between adjacent slots at 60° intervals.

The inner surface bounding each slot 32 is a conical surface tangent to the surface of the hemi-toroidal wall 20. Preferably, the angle of the slot of the slot to the axis of the seal is about 35°. The flow scouring the wall 20 tends to continue in a straight line through the slot and the amount discharged through the slot is a function of the width of the slot. As will be apparent from the arrows 35 and 28, flow through the slots 32 impinges roughly perpendicularly on the main stream flowing around the barrier 22 toward the second seal knife 26. The action of successive seal knives, seal surfaces, and barriers downstream of the first set is the same as the first and need not be further described.

Demonstration in a flow visualization rig has shown an increase in turbulence due to this diverted flow impinging on the main flow. Experience with rotating models of these seals under an air pressure differential has demonstrated a sealing effectiveness considerably greater than that of conventional labyrinth seals.

The preferred proportions of the seal parts are generally as shown in FIGS. 1 and 3. In a particular seal with a rotating member 150 mm. in diameter, the clearance between the seal knives and lands, and the width of slot 32, were 0.25 mm.

In the seal illustrated, one seal member lies radially outside of the other. It will be apparent the relative position of the seal knives and of the seal lands could be reversed to put the structure of the stationary member on the rotating member and vice versa. However, this is not desirable because of matters of structural integrity of the barriers 22 unless the outer member is the rotating one.

Also, it will be noted that the seal illustrated is one in which the diameter converges in the downstream direction. This is most favorable to sealing, since gas rotation around the axis of the seal induced by the rotation of one seal member creates a back pressure impeding flow through the seal. However, the principles of the seal are applicable to seals in which the diameter increases downstream or in which the diameters of the knives remain essentially constant from one end to the other. In this last case, with the structure shown, one seal member would presumably have to be sectional to permit assembly of the seal, but the seal could operate in the same manner. A seal embodying the structure described can also be constructed so that the path of flow is generally radial between two coaxial members standing in face-to-face relation.

The advantages of the invention as described should be clear to those skilled in the art from the foregoing description and accompanying drawings.

The detailed description of the preferred embodiment of the invention for the purpose of explaining the principles thereof is not to be considered as limiting or restricting the invention, since many modifications may be made by the exercise of skill in the art.

I claim:

1. A labyrinth seal comprising two relatively rotatable annular proximate members and having an upstream end and a downstream end, the said members being configured to define between them a succession of annular orifices and to define between them a doubly recurved flow path from each orifice to the next downstream orifice, the said flow path being bounded by a barrier having a hemi-toroidal surface downstream of the orifice to reverse the flow the first time after passing the orifice, the flow path extending over the barrier downstream of the second reversal; and the barrier defining outlets through the barrier substantially tangent to the said hemi-toroidal surface discharging into the flow path downstream of the second reversal to increase turbulence in the flow.

2. A labyrinth seal comprising two relatively rotatable annular proximate members and having an upstream end and a downstream end, the said members being configured to define between them a succession of annular orifices and to define between them a doubly recurved flow path from each orifice to the next downstream orifice, the said flow path being bounded by a barrier having a hemi-toroidal surface downstream of the orifice to reverse the flow the first time after passing the orifice, the flow path extending over the barrier downstream of the second reversal; and the barrier defining slot-like outlets through the barrier substantially tangent to the said hemi-toroidal surface discharging into the flow path downstream of the second reversal transversely to the said flow path to increase turbulence in the flow.

3. A labyrinth seal comprising two relatively rotatable annular proximate members and having an upstream end and a downstream end, the first one of the said members having a plural number of annular knives extending from its surface toward the other member, the second one of the said members defining a plurality of relatively stepped seal surfaces, each knife confronting one of the said seal surfaces, the said second member having recurved hemi-toroidal surfaces defining an annular pocket at the downstream end of each said seal surface and having a barrier extending toward the upstream end of the seal from the said recurved surface, fluid leaking between a knife and the proximate seal surface tending to flow along the said seal surface and be deflected reversely by the recurved surface before flowing toward the downstream end of the seal, the flow after passing each knife other than the most downstream knife reversing flow direction around the barrier to proceed to the next downstream knife, the barrier having slot means extending tangentially to the recurved surface through the barrier to direct fluid from the pocket into the space between the barrier and the said first member to increase turbulence in the flow between the barrier and the next downstream knife.

4. A labyrinth seal comprising two relatively rotatable annular proximate members and having an upstream end and a downstream end, the first one of the said members having a plural number of annular knives extending from its surface toward the other member, the second one of the said members defining a plurality of relatively stepped substantially cylindrical seal surfaces, each knife confronting one of the said seal surfaces, the said second member having recurved hemi-toroidal surfaces defining an annular pocket at the downstream end of each said seal surface and having a barrier extending toward the upstream end of the seal from the said recurved surface, fluid leaking between a knife and the proximate seal surface tending to flow along the said seal surface and be deflected reversely by the recurved surface before flowing toward the downstream end of the seal, the flow after passing each knife other than the most downstream knife reversing flow direction around the barrier to proceed to the next downstream knife, the barrier having slot means extending tangentially to the recurved surface at about a 35° angle to the seal axis through the barrier to direct fluid from the pocket into the space between the barrier and the said first member to increase turbulence in the flow between the barrier and the next downstream knife.

* * * * *